United States Patent
Lambert et al.

(10) Patent No.: US 7,890,368 B2
(45) Date of Patent: Feb. 15, 2011

(54) PROVIDING TARGETED ADVERTISING INVENTORY

(75) Inventors: James P. Lambert, Toluca Lake, CA (US); Mark DuVall, Torrance, CA (US)

(73) Assignee: Clear Channel Management Services, Inc., San Antonio, TX (US)

( * ) Notice: Subject to any disclaimer, the term of this patent is extended or adjusted under 35 U.S.C. 154(b) by 1387 days.

(21) Appl. No.: 09/854,319

(22) Filed: May 11, 2001

(65) Prior Publication Data

US 2004/0073481 A1     Apr. 15, 2004

(51) Int. Cl.
    *G06Q 30/00*    (2006.01)
(52) U.S. Cl. ............... 705/14.4; 705/14.41; 705/14.49; 705/14.54; 705/14.55; 705/14.72; 705/14.73
(58) Field of Classification Search ............... 705/14.4, 705/14.41, 14.49, 14.54, 14.55, 14.72, 14.73
    See application file for complete search history.

(56) References Cited

U.S. PATENT DOCUMENTS

| | | | |
|---|---|---|---|
| 5,778,187 A | | 7/1998 | Monteiro et al. |
| 5,822,735 A | * | 10/1998 | De Lapa et al. ............... 705/14 |
| 5,983,005 A | | 11/1999 | Monteiro et al. |
| 6,035,280 A | * | 3/2000 | Christensen ............... 705/14 |
| 6,119,163 A | | 9/2000 | Monteiro et al. |
| 6,185,541 B1 | * | 2/2001 | Scroggie et al. ............... 705/14 |
| 6,324,519 B1 | * | 11/2001 | Eldering ............... 705/14 |
| 6,757,662 B1 | * | 6/2004 | Greenwald et al. ............ 705/14 |
| 6,885,994 B1 | * | 4/2005 | Scroggie et al. ............... 705/14 |

OTHER PUBLICATIONS

Shermach, Kelly. "Elctronic Coupon Program Offers data-base Potential", Sep. 25, 1995, Marketing News, 1.*

* cited by examiner

*Primary Examiner*—Raquel Alvarez
(74) *Attorney, Agent, or Firm*—Edward J. Marshall Attorney at Law, PLLC

(57) ABSTRACT

The present invention discloses a method, apparatus, and article of manufacture for providing targeted information. In one embodiment of the present invention, an encrypted request for targeted information is received from a user. The encrypted request has a logon authorization element and a parameter requirement element. When the logon authorization element is satisfied, an encrypted list of data items is transmitted to the user. Each data item satisfies the parameter requirement element. In one embodiment, the data item is an advertisement. The above-described invention has utility for providing the user with advertisement options that satisfy the user's parameter requirements.

19 Claims, 4 Drawing Sheets

PROVIDING TARGETED ADVERTISING INVENTORY

FIELD OF THE INVENTION

This invention relates in general to computer implemented systems, and more particularly, to a technique of providing targeted information.

DESCRIPTION OF RELATED ART

The Internet is a vast collection of global-spanning networks that communicate with each other by using protocols, such as the Transmission Control Protocol (TCP) and the Internet Protocol (IP). Via its networks, the Internet enables many computers, located at different sites around the world, to access information from each other.

The World Wide Web (i.e., the "WWW" or the "Web") is the fastest growing part of the Internet. The Web works within a client/server model. Web client software runs on the Web client computers, and Web server software runs on the Web server computer. Web client software—known as the Web browser—interacts with both the user and the Web server software. In particular, the Web browser receives a Universal Resource Locator (URL) request from a user. The URL is a unique identifier for requested information. The Web browser then sends the URL request to the Web server software using Hypertext Transfer Protocol (HTTP). In response to the URL request, the Web server software locates and returns the requested information to the Web browser.

The Web contains Web pages that incorporate text, graphics, sound, animation, and other multimedia elements. Many Web pages are formatted in a language called HyperText Markup Language (HTML). HTML controls the appearance of a Web page. Specifically, HTML controls how information, such as, text, images, and push-buttons are arranged on a Web page. Hypertext links connect the web pages to each other, and to any other pages, graphics, binary files, or multimedia files.

HTML is based on SGML (Standard Generalized Markup Language). SGML allows documents to describe their own grammar—that is, to specify a tag set used in the document, and to specify the structural relationships that those tags represent. SGML makes it possible to define different formats, for your each document; to handle large and complex documents, and to manage large information repositories. Full SGML, however, contains many optional features that are not needed for Web applications.

HTML web pages incorporate a small set of tags in conformance with SGML. In general, HTML is well suited for hypertext, multimedia, and the display of small and reasonably simple documents. HTML is not well suited for large, complex documents.

The World Wide Wed Consortium (W3C) created a simplified subset of SGML, specially designed for Web applications, and designed for large and complex documents. This subset is called XML (Extensible Markup Language). XML is independent of any platform, vendor, or application. Therefore, XML can be used to exchange information, without regard to the system that the information is coming from or going to. In addition, XML enables the exchange of information, not only between different computer systems, but it also enables the exchange of information across different languages.

The Web has provided authors, scientist, academics, and other content providers with a vehicle for distributing their works across a global network. Web users, however, seem to view the Web as analogous to basic cable. For cable, people pay a basic rate for the cable connection, and rarely do they pay additional fees for a particular cable show. Similarly, Web users are willing to pay a basic rate for an Internet connection, but they are less willing to pay additional fees for content. Consequently, advertising is one way that the content provider can generate revenue.

Many content providers seek to increase their advertising revenue by targeting advertisements to users, based on variables such as gender, age, geographic location, etc. In general, content providers can justify high advertising rates by showing that a company's advertisements are being viewed by users that would likely purchase the company's product.

Some content providers obtain targeted advertisements from Internet advertisement providers. Typically, a content provider submits demographic requirements to an advertisement provider, and the advertisement provider furnishes the content provider with a single advertisement that satisfies the demographic requirements. Such a system disadvantageously lacks flexibility and restricts the content provider's options to the single advertisement. Thus, there is a need in the art for a technique of furnishing the content provider with advertising options.

SUMMARY OF THE INVENTION

To overcome the limitations in the prior art described above, and to overcome other limitations that will become apparent upon reading and understanding the present specification, the present invention discloses a method, apparatus, and article of manufacture for providing targeted information.

In one embodiment of the present invention, an encrypted request for targeted information is received from a user. The encrypted request has a logon authorization element and a parameter requirement element. When the logon authorization element is satisfied, an encrypted list of data items is transmitted to the user. Each data item satisfies the parameter requirement element. In one embodiment, the data item is an advertisement.

The above-described invention has utility for providing the user with advertisement options that satisfy the user's parameter requirements.

BRIEF DESCRIPTION OF THE DRAWINGS

Referring now to the drawings in which like reference numbers represent corresponding parts throughout.

DETAILED DESCRIPTION

Figure 1:
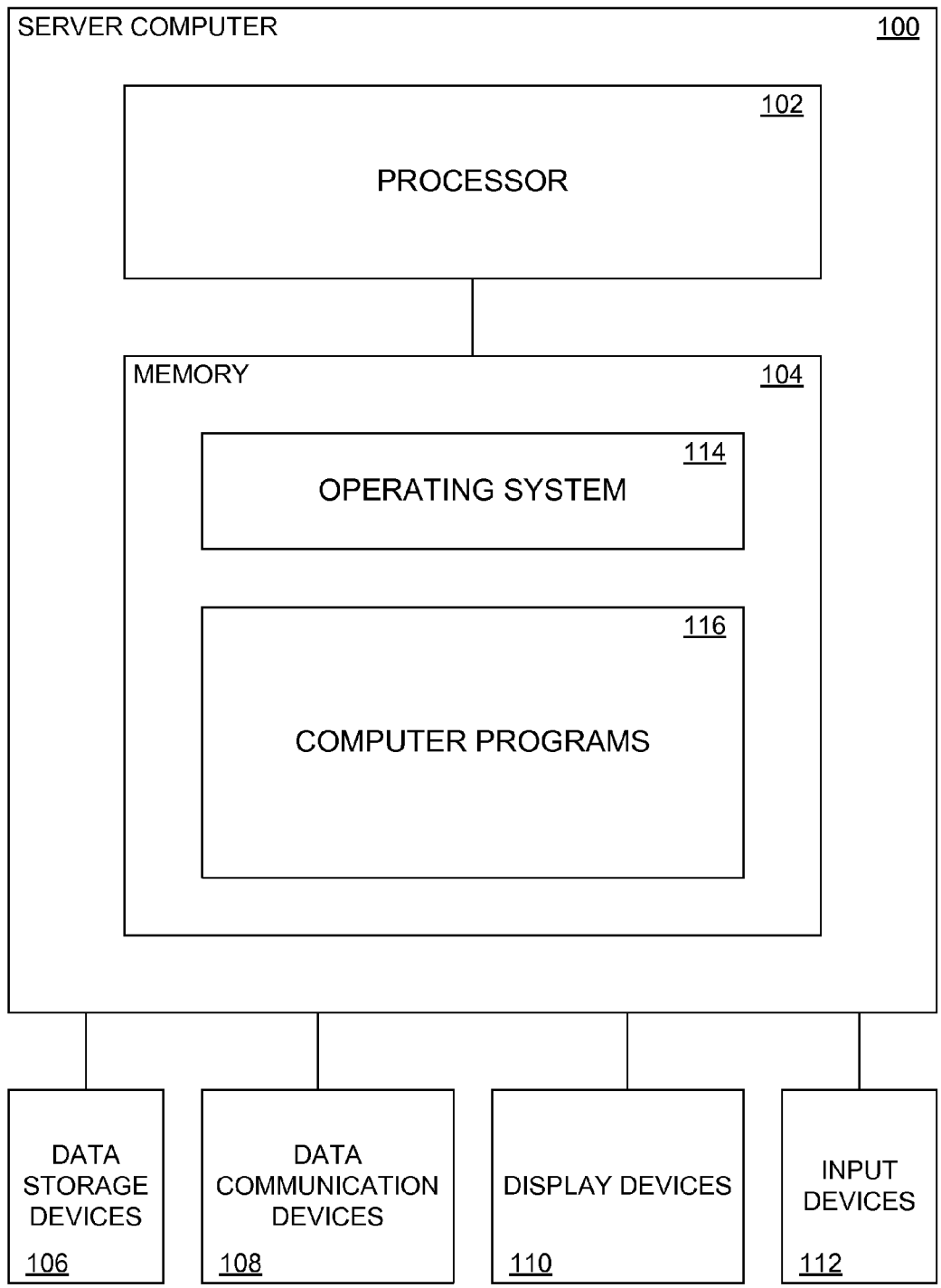
FIG. 1 is a schematic diagram illustrating a hardware environment used to implement a server computer in one embodiment of the invention.

In the following description of embodiments of the invention, reference is made to the accompanying drawings which form a part hereof, and which is shown by why of illustration a specific embodiment in which the invention may be practiced. It is to be understood that other embodiments may be utilized as structural changes may be made without departing from the scope of the present invention.

This invention is comprised of a collection of components, which will be referred to herein as the "Third Party Advertising System" or "TPAS." It is to be understood that these components may be combined in many different ways to form a variety of combinations within the scope of the invention.

The TPAS enables a user to access a list of targeted advertisement options (also referred to as data items). Initially, the user at a client computer invokes the TPAS. The TPAS then requests logon authorization information from the user. The logon authorization information includes a client identifier (e.g., username and/or password), a client interface version, and the Greenwich Mean Time (GMT).

To determine whether a user is an authorized user, the TPAS system compares the client identification information with logon information contained in a database that is connected to the TPAS server computer. When a match exists, the TPAS returns a limited life span key to the user. This limited life span key provides the user with the ability to encrypt data and decipher encrypted data. The limited life span key is active for a pre-defined time duration (e.g., ten minutes).

The user uses the limited life span key to encrypt a request for targeted advertisement options. The request contains parameter requirements, including audience demographic requirements and/or content requirements. The user sends the encrypted request to the TPAS.

In response to the encrypted request, the TPAS compares the parameter requirements with the description of each advertisement stored in the database. The TPAS then uses XML to create a list which contains each advertisement that satisfies the parameter requirements. Advertisements that satisfy the parameter requirements are referred to as targeted advertisements. Of course, a different mark-up language could be used for the list, such as HTML or SGML, without exceeding the scope of this invention.

Next, the TPAS encrypts the XML list, and returns the encrypted list to the client computer. The client computer uses its limited life span key to decrypt the XML list of targeted advertisements.

At this point, the user may select one or more targeted advertisements from the list. The user can then purchase the selected, targeted advertisements from any advertisement provider. When the purchased advertisements are played and/or displayed, the client computer sends a XML report to the TPAS. Of course, a different mark-up language could be used for the report, such as HTML or SGML, without exceeding the scope of this invention.

One advantageous feature of the TPAS includes providing users with a list of targeted advertisements, wherein, each of the targeted advertisements satisfies the user's parameter requirements. In addition, since XML can be used to exchange information, without regard to the system that the information is coming from or going to, the TPAS can be used with any device or appliance that can transmit and receive a XML communication.

Before providing the details of the TPAS, the hardware environments used to implement a client computer and a server computer in one embodiment of the present invention are discussed.

Hardware

FIG. 1 is a schematic diagram illustrating a hardware environment used to implement a server computer 100 in one embodiment of the invention. The present invention is typically implemented using a server computer 100, which generally includes a processor 102, a random access memory (RAM) 104, data storage devices 106 (e.g., hard, floppy, and/or CD-ROM disk, drives, etc.) data communications devices 108 (e.g., modems, network interfaces, etc.), display devices 110 (e.g., CRT, LCD display, etc.), and input devices 112 (e.g., mouse pointing device, keyboard, CD-ROM drive, etc.). It is envisioned that attached to the server computer 100 may be other devices, such as read only memory (ROM), a video card, bus interface, printers, etc. Those skilled in the art will recognize that any combination of the above components, or any number of different components, peripherals, and other devices, may be used with the server computer 100.

The server computer 100 operates under the control of an operating system (OS) 114. The operating system 114 is booted into the memory 104 of the server computer 100 for execution when the server computer 100 is powered-on or reset. In turn, the operating system 114 then controls the execution of one or more computer programs 116, such as the comparison software for comparing the parameter requirements with available advertisements, and list software for creating a XML list of targeted advertisements. The present invention is generally implemented in these computer programs 116, which execute under the control of the operating system 114, and cause the server computer 100 to perform the desired functions as described herein.

The operating system 114 and computer programs 116 are comprised of instructions which, when read and executed by the server computer 100, cause the server computer 100 to perform the steps necessary to implement and/or use the present invention. Generally, the operating system 114 and/or computer programs 116 are tangibly embodied in and/or readable from a device, carrier, or media such as memory 104, data storage devices 106, and/or data communications devices 108. Under control of the operating system 114, the computer programs 116 may be loaded from the memory 104, data storage devices 106, and/or data communications devices 208 into the memory 204 of the server computer 100 for use during actual operations.

Thus, the present invention may be implemented as a method, apparatus, or article of manufacture using standard programming and/or engineering techniques to produce software, firmware, hardware, or any combination thereof. The term "article of manufacture" (or alternatively, "computer program product") as used herein, is intended to encompass a computer program accessible from any computer-readable device, carrier, or media. Of course, those skilled in the art will recognize many modifications may be made to this configuration without departing from the scope of the present invention.

Those skilled in the art will also recognize that the environment illustrated in FIG. 1 is not intended to limit the present invention. Indeed, those skilled in the art will recognize that other alternative hardware environments may be used without departing from the scope of the present invention.

Figure 2:
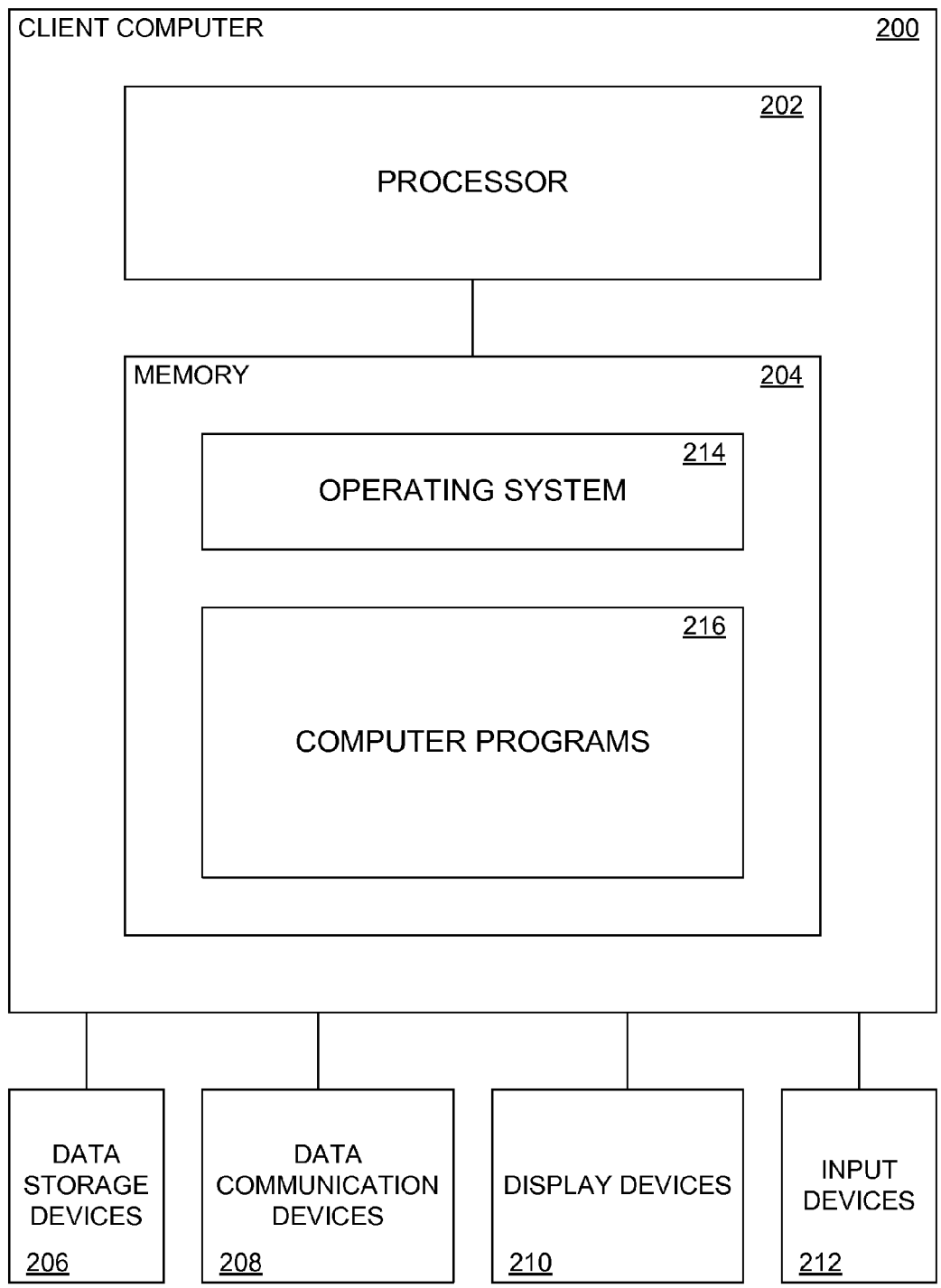
FIG. 2 is a schematic diagram illustrating a hardware environment used to implement a client computer in one embodiment of the invention.

FIG. 2 is a schematic diagram illustrating a hardware environment used to implement a client computer 200 in one of the invention. The present invention is typically implemented using a client computer 200, which generally includes a processor 202, a random access memory (RAM) 204, data storage devices 206 (e.g., hard, floppy, and/or CD-ROM disk, drives, etc.), data communications devices 208 (e.g., modems, network interfaces, etc.), display devices 210 (e.g., CRT, LCD display, etc.), and input devices 212 (e.g., mouse pointing device, keyboard, CD-ROM drive, etc.). It is envisioned that attached to the client computer 200 may be other devices, such as read only memory (ROM), a video card, bus interface, printers, etc. Those skilled in the art will recognize that any combination of the above components, or any number of different components, peripherals, and other devices, may be used with the client computer 200.

The client computer 200 operates under the control of an operating system (OS) 214. The operating system 214 is booted into the memory 204 of the client computer 200 for execution when the client computer 200 is powered-on or reset. In turn, the operating system 214 then controls the execution of one or more computer programs 216, such as software for reporting when an advertisement has been played/displayed. The present invention is generally implemented in these computer programs 216, which execute under the control of the operating system 214, and cause the client computer 200 to perform the desired functions as described herein.

The operating system 214 and computer programs 216 are comprised of instructions which, when read and executed by the client computer 200, cause the client computer 200 to perform the steps necessary to implement and/or use the present invention. Generally, the operating system 214 and/or computer programs 216 are tangibly embodied in and/or readable from a device, carrier, or media such as memory 204, data storage devices 206, and/or data communications devices 208. Under control of the operating system 114, the computer programs 116 may be loaded from the memory 204, data storage devices 206, and/or data communication devices 208 into the memory 204 of the client computer 200 for use during actual operations.

Thus, the present invention may be implemented as a method, apparatus or article of manufacture, using standard programming and/or engineering techniques to produce software, firmware, hardware, or any combination thereof. The term "article of manufacture" (or alternatively, "computer program product") as used herein, is intended to encompass a computer program accessible from any computer-readable device, carrier, or media. Of course, those skilled in the are will recognize many modifications may be made to this configuration without departing from the scope of the present invention.

Those skilled in the art will also recognize that the environment illustrated in FIG. 2 is not intended to limit the present invention. Indeed, those skilled in the art will recognize that other alternative hardware environments may be used without departing from the scope of the present invention.

Generating a List of Advertising Options

Figure 3:
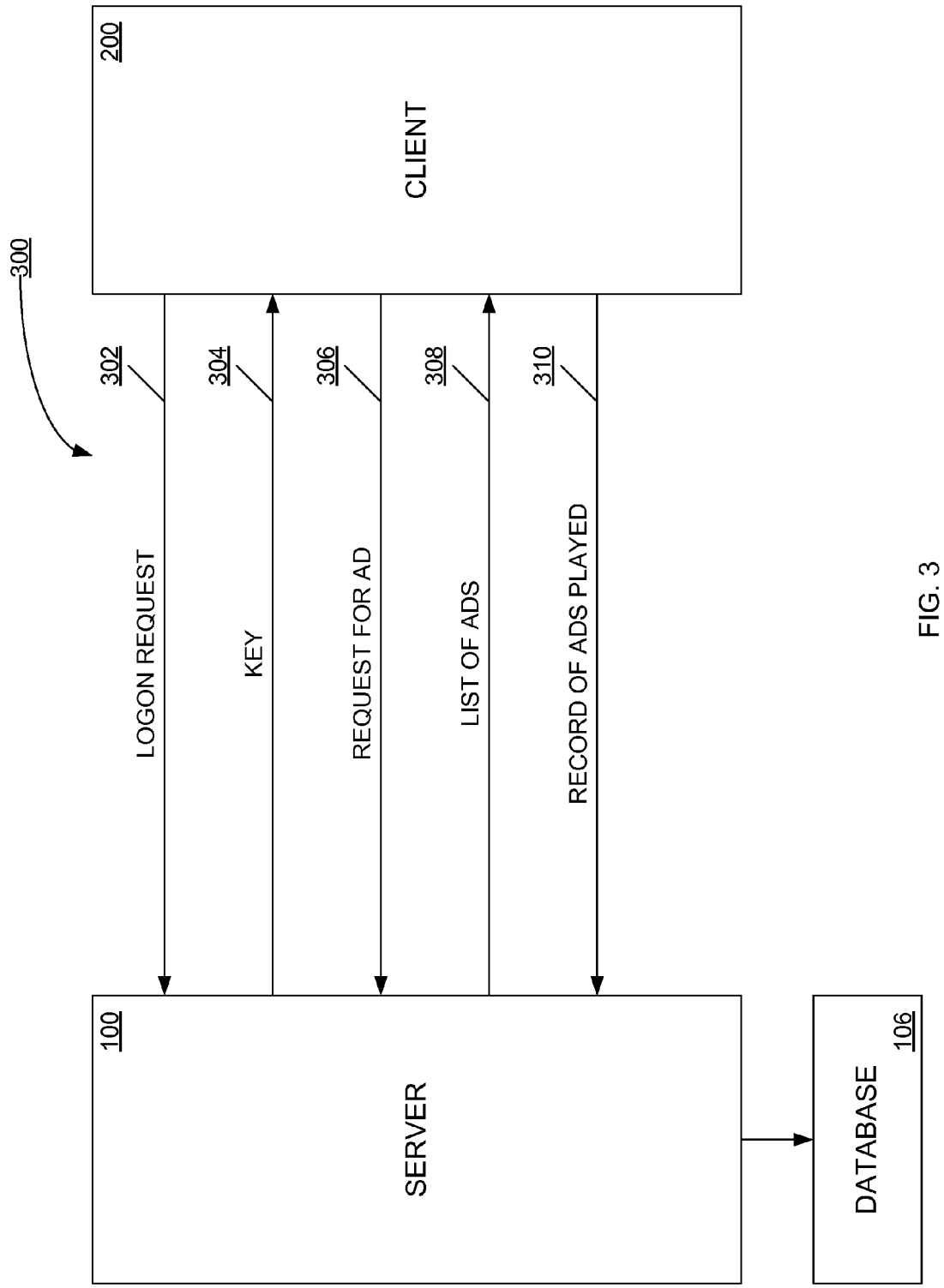
FIG. 3 is a schematic diagram illustrating a client/server computer environment of an embodiment of the present invention.

FIG. 3 is a schematic diagram illustrating a client/server computer environment of an embodiment of the present invention, and more particularly, illustrates a typical distributed computer system 300 using the Internet to connect the server computer 100 to the client computer 200.

The server computer 100 is connected to a database 106 that contains user logon authorization information and information about the available data items. In FIG. 3, the data items are advertisements. Those skilled in the art will recognize that other data items may be used without departing from the scope of the present invention.

The logon authorization information includes client identifiers (e.g., usernames and passwords) for users that are authorized to access the TPAS system. The advertisement information includes, but is not limited to the following: (1) the title of the advertisement; (2) the spot identification number; (3) the flight identification number; (4) the spot Universal Resource Locator (URL); (5) the click action URL; (6) the duration; and (7) the description.

The title of the advertisement provides a descriptive title and the spot identification number is based on the type of advertisement. For example, a banner advertisement may have a different spot identification number than an audio advertisement. The flight identification number is associated with the following: the target audience of an advertisement; the period of time during which a particular advertisement is played/displayed; and the number of times that the advertisement will be played/displayed. The spot URL and the click action URL define the location of the advertisement. The duration defines the time length (e.g., five seconds) of the advertisement. The description contains a written description, possibly provided by the advertiser.

A user at a client computer 200 invokes the TPAS. The user could be a content provider, such as an Internet radio station or a music on demand Web site, or any other Web site that provides content. At the server computer 100, the TPAS system requests the logon authorization information from the user. The logon authorization information includes the user's interface version, client identifier, and GMT time. Arrow 302 represents the client computer 200 sending a logon request to the server computer 100. It is noted that all communication between the client computer 200 and the server 100 computer is in XML, and each communication has a specific header that identifies the content of the communication. For example, the communication may be a logon communication, a request communication, etc.

To determine whether a user is an authorized user, the TPAS system compares the client identifier information with the logon authorization information contained in the database 106. When a match exists, the TPAS returns a limited life span key to the user, as represented by Arrow 304. This limited life span key provides the user with the ability to encrypt data and decipher encrypted data. The limited life span key is active for a pre-defined time duration (e.g., ten minutes).

The user uses the limited life span key to encrypt and send a request for targeted advertisement options, as represented by Arrow 306. The request contains parameter requirements, including audience demographic requirements and/or content requirements. The audience demographic requirements include, but are not limited to, age, gender, geographic location, interests, education, income, and musical format.

In one embodiment, the location demographic requirement includes the real time location. For example, assume that the content provider seeks to provide an advertisement to someone that is standing in front of a coffee shop. The content provider will then request advertisement options that are related to that particular coffee shop.

The musical format, includes any compressed format (e.g., WMP, Real, QT, MP3, Liquid, or Emblaze). Other content requirements include, but are not limited to, spot type, gateway, inserted, audio or video, graphic, encoding, encoding rate, and Codec. Exemplary spot types include, but are not limited to, a promotional advertisement, a gateway advertisement, or a banner advertisement.

The TPAS compares the parameter requirements with the advertisement descriptions. The TPAS then uses XML to create a list that contains each advertisement which satisfies the parameter requirements. Each advertisement is tagged (or affixed) with its advertisement information.

Next, the TPAS encrypts the XML list, and returns the encrypted list to the client computer, as represented by Arrow 308. The client computer uses its limited life span key to decrypt the XML list of targeted advertisements.

The user may select one or more targeted advertisements from the list. The user can then purchase the selected, targeted advertisements from any advertisement provider. When the purchased advertisements are played and/or displayed, the client computer sends a XML report to the TPAS, as represented by Arrow 310. The report is a specified XML schema that includes, but is not limited to: the client identification number, the spot identification number, the flight identification number, the start and stop play/display time in GMT, and the number of times that the advertisements was played/displayed.

Figure 4:
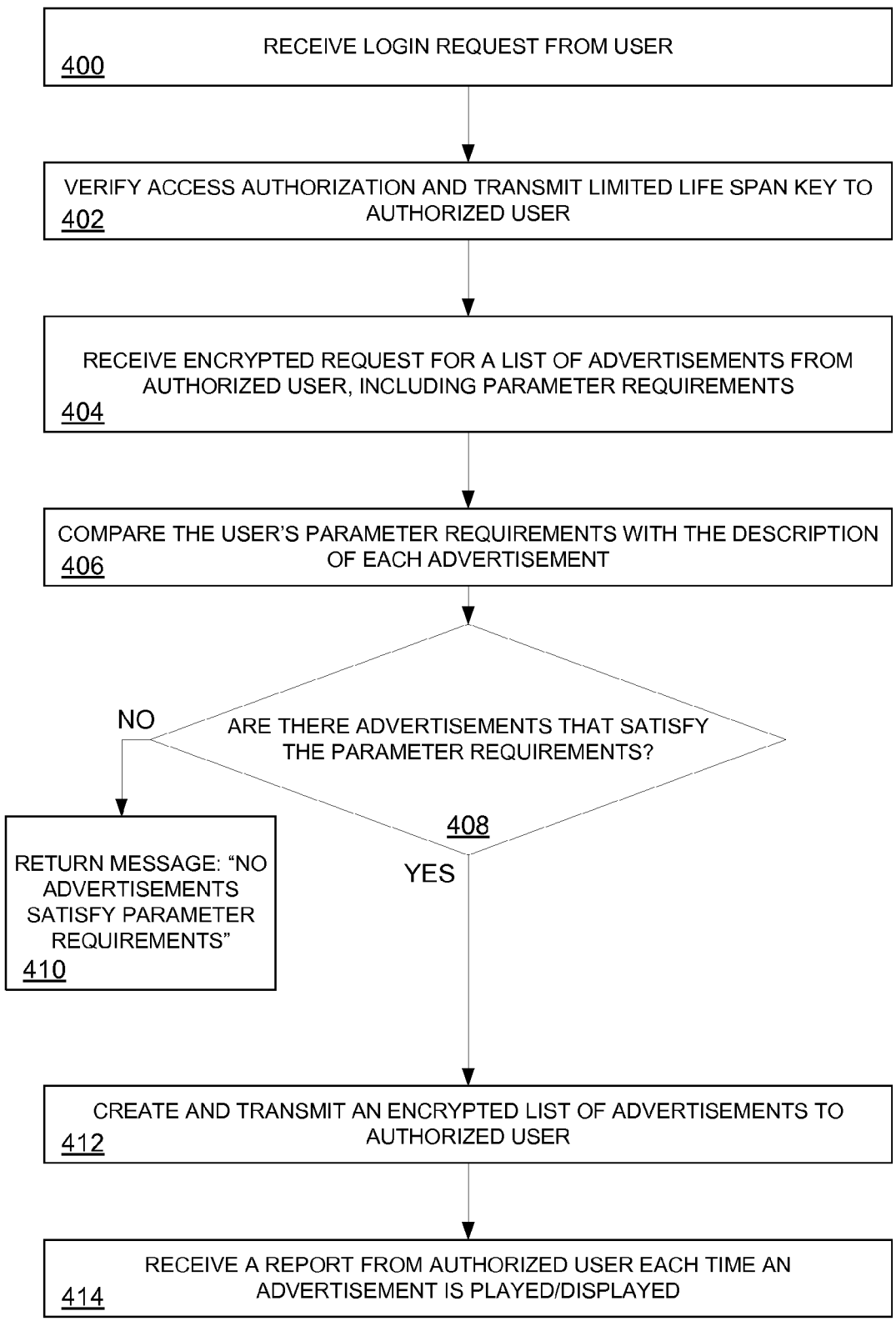
FIG. 4 is a flow diagram illustrating the process performed by the Third Party Advertising System.

FIG. 4 is a flow diagram illustrating the process performed by the TPAS. Block 400 represents the TPAS receiving a logon request from a user. When the user is an authorized user, the TPAS transmits a limited life span encryption key, as represented by block 402.

Block 404 represents the TPAS receiving an encrypted request for a list of targeted advertisements from the authorized user. The request includes parameter requirements, including audience demographic requirements and content requirements. The TPAS then compares the parameter requirements with the descriptions of each advertisement, as represented by block 406.

Block 408 is a decision block that represents the TPAS determining whether there are any advertisements that satisfy the parameter requirements. When there are advertisements that satisfy the parameter requirements, the TPAS creates and transmits the list of targeted advertisements to the authorized user, as represented by block 412. The TPAS then proceeds to block 414.

Block 414 represents the TPAS system receiving an XML report from the authorized user each time a targeted advertisement is played and/or displayed.

Otherwise, when no advertisements satisfy the parameter requirements, the TPAS returns a message stating that: "no advertisements satisfy the parameter requirements," as represented by block 410.

Conclusion

This concludes the description of the preferred embodiment of the invention. The following describes some alternative embodiments for accomplishing the present invention. For example, other hardware environments may include without limitation, communications devices, such as appliances, personal digital assistants (PDAs), wrist watches, stand alone Internet radios, set top boxes, television systems, mainframe computers, minicomputers or personal computers. These may be used in various configurations, such as in a local area network or in conjunction with the Internet. These other environments may work with each other or may work independently.

The foregoing description of the embodiments of the invention has been presented for the purposes of illustration and description. It is not intended to be exhaustive or to limit the invention to the precise from disclosed. Many modifications and variations are possible in light of the above teaching. It is intended that the scope of the invention be limited not by this detailed description, but rather by the claims appended hereto.

What is claimed:

1. A method comprising:
   receiving, at a server, a first message from a content provider computer, the first message including a request to provide an advertisement matching at least one audience parameter;
   in response to the receiving, accessing a database storing advertising information associated with a plurality of advertisements, wherein the advertising information includes, a spot identifier, an advertisement location identifier; and description information;
   selecting a plurality of advertisements based on a comparison of the at least one audience parameter with the description information; and
   transmitting, a second message from the server to the content provider computer, the second message including a listing of the plurality of advertisements and advertisement location identifiers associated with each of the plurality of advertisements.

2. The method of claim 1, wherein said at least one audience parameter includes at least one content requirement.

3. The method of claim 1, wherein the advertising information further includes flight information indicating a number of times an advertisement is to be presented, the method further comprising:
   receiving, at the server, a third message from the content provider indicating that said advertisement has been presented; and
   updating the flight information related to the advertisement in response to receiving the third message.

4. The method of claim 3, wherein the receiving includes receiving a plurality of unique identifiers based on a selection of advertisements from said list of advertisements.

5. The method of claim 1, wherein the descriptive information comprises a title of the advertisement.

6. The method of claim 1, wherein said audience parameter comprises audience demographic requirements.

7. The method of claim 1, wherein the list of advertisements is encrypted.

8. The method of claim 1, wherein the content provider is a radio station.

9. The method of claim 1, wherein the advertisement location identifier comprises a Universal Resource Locator (URL).

10. The method of claim 1, wherein the advertisement location identifier comprises a click action URL.

11. The method of claim 1, wherein the descriptive information comprises a time duration.

12. The method of claim 1, wherein the descriptive information comprises a description provided by an advertiser associated with the advertisement.

13. The method of claim 1, wherein the spot identifier indicates a media type of an advertisement with which the spot identifier is associated.

14. An apparatus comprising:
   a processor;
   a communications interface;
   memory operably associated with the processor;
   a program of instructions configured to be stored in the memory and executed by the processor, the program of instructions including:
   at least one instruction to receive a first message via the communications interface, the first message including a request to provide an advertisement matching at least one audience parameter;
   at least one instruction to access a database in response to receiving the first message, the database storing advertising information associated with a plurality of advertisements, the advertising information includes, a spot identifier, an advertisement location identifier; and description information;
   at least one instruction to select a plurality of advertisements based on a comparison of the at least one audience parameter with the description information; and
   at least one instruction to transmit, a second message from the server to the content provider computer, the second message including a listing of the plurality of advertisements and advertisement location identifiers associated with each of the plurality of advertisements.

15. The apparatus of claim 14, wherein the advertising information further includes flight information indicating a number of times an advertisement is to be presented, the program of instructions further comprising:
- at least one instruction to receive a third message indicating that the advertisement has been presented; and
- at least one instruction to update the flight information related to the advertisement in response to receiving the third message.

16. The apparatus of claim 14, wherein the spot identifier indicates a media type of an advertisement with which the spot identifier is associated.

17. A computer readable medium tangibly embodying a program of computer executable instructions, the program of instructions comprising:
- at least one instruction to receive a first message via the communications interface, the first message including a request to provide an advertisement matching at least one audience parameter;
- at least one instruction to access a database in response to receiving the first message, the database storing advertising information associated with a plurality of advertisements, wherein the advertising information includes, a spot identifier, an advertisement location identifier; and description information;
- at least one instruction to select a plurality of advertisements based on a comparison of the at least one audience parameter with the description information; and
- at least one instruction to transmit, a second message from the server to the content provider computer, the second message including a listing of the plurality of advertisements and advertisement location identifiers associated with each of the plurality of advertisements.

18. The computer readable medium of claim 17, wherein the advertising information further includes flight information indicating a number of times an advertisement is to be presented, the program of instructions further comprising:
- receiving, at the server, a third message indicating that said advertisement has been presented; and
- updating the flight information related to the advertisement in response to receiving the third message.

19. The computer readable medium of claim 17, wherein the spot identifier indicates a media type of an advertisement with which the spot identifier is associated.

* * * * *